(12) United States Patent
Qi et al.

(10) Patent No.: US 8,984,224 B2
(45) Date of Patent: Mar. 17, 2015

(54) MULTIPLE INSTANCES OF MAPPING CONFIGURATIONS IN A STORAGE SYSTEM OR STORAGE APPLIANCE

(71) Applicant: NetApp, Inc., Sunnyvale, TX (US)

(72) Inventors: Yanling Qi, Austin, TX (US); Jason Sherman, Wichita, KS (US)

(73) Assignee: NetApp, Inc., Sunnyvlae, CA (US)

( * ) Notice: Subject to any disclaimer, the term of this patent is extended or adjusted under 35 U.S.C. 154(b) by 0 days.

(21) Appl. No.: 14/161,439

(22) Filed: Jan. 22, 2014

(65) Prior Publication Data

US 2014/0129771 A1     May 8, 2014

Related U.S. Application Data

(63) Continuation of application No. 11/633,780, filed on Dec. 5, 2006, now Pat. No. 8,700,846.

(51) Int. Cl.
*G06F 12/00*     (2006.01)
*G06F 3/06*     (2006.01)

(52) U.S. Cl.
CPC ............ *G06F 3/0646* (2013.01); *G06F 3/0605* (2013.01); *G06F 3/0631* (2013.01); *G06F 3/0665* (2013.01); *G06F 3/067* (2013.01); *G06F 3/0604* (2013.01)
USPC ........... 711/114; 711/153; 711/165; 711/170; 711/200; 711/202

(58) Field of Classification Search
CPC ...... G06F 3/067; G06F 3/0644; G06F 3/0646
USPC .................. 711/114, 165, 153, 170, 200, 202
See application file for complete search history.

(56) References Cited

U.S. PATENT DOCUMENTS

| 6,681,325 | B1 | 1/2004 | Marsh et al. |
| 7,328,307 | B2 * | 2/2008 | Hoogterp ...................... 711/114 |
| 2004/0083345 | A1 | 4/2004 | Kim et al. |
| 2004/0268148 | A1 | 12/2004 | Karjala et al. |
| 2005/0144383 | A1 | 6/2005 | Higaki et al. |
| 2008/0016311 | A1 | 1/2008 | Harada |

* cited by examiner

*Primary Examiner* — Jasmine Song
(74) *Attorney, Agent, or Firm* — Haynes and Boone, LLP (57) ABSTRACT

The present invention is directed to a method and software for managing the host-to-volume mappings of a SAN storage system. The host-to-volume mappings of the SAN storage system are represented in mapping configuration components. The active mapping configuration component represents the current host-to-volume mapping for the SAN storage system. Only one mapping configuration component is active at a time. The host-to-volume mappings of the SAN storage system are changed by deactivating the active mapping configuration component and activating an inactive mapping configuration component that represents a different mapping configuration, effecting a repartition, repurpose, disaster recovery, or other business activity. This can be a scheduled task or performed in an on-demand manner. The mapping configuration components are managed and controlled through the management component of the SAN storage system.

20 Claims, 7 Drawing Sheets

MULTIPLE INSTANCES OF MAPPING CONFIGURATIONS IN A STORAGE SYSTEM OR STORAGE APPLIANCE

REFERENCE TO RELATED APPLICATIONS

This application is a continuation of U.S. patent application Ser. No. 11/633,780, filed on Dec. 5, 2006, which is hereby incorporated by reference in its entirety.

FIELD OF THE INVENTION

This invention relates generally to storage area networks (SAN), and particularly to a method and software for managing modification of host-to-volume mappings in a storage system.

BACKGROUND OF THE INVENTION

Today's enterprise data centers and high performance computing environments are constantly looking for ways to optimize computing resources and reduce their total operating costs. One way in which they accomplish this is by regularly modifying the host-to-volume mapping configurations in a storage system. In a SAN storage system, volume-to-host mapping (also known as LUN [logical unit number] masking, selective presentation or storage partitions) is a technique that allows a host or hosts to see only a specified set of logical volumes in a storage system. This mapping is necessary for data integrity, volume access control, storage virtualization and consolidation, fault isolation, and data protection from accidental deletion of data. Modification of volume-to-host mapping is done to allow the organization to implement computer server repartitioning (moving servers from a low workload server group to a heavy workload group), server repurpose (reallocating a server used for one purpose for another purpose), disaster recovery, and other business activities.

The conventional approach to this problem, with the existing technologies of a storage system, is for a storage administrator to manually modify mapping configuration through a GUI management application or through a command line interface application of a storage system. In order for the process to be automated, script files of command line interface must be created. If N mapping configurations are designed, N! (N factorial) script files are required. If three mapping configurations are designed, six script files would have to be created (to modify mapping configuration from: implementation one to implementation two, implementation two to implementation one, implementation one to implementation three, implementation three to implementation one, implementation two to implementation three, and implementation three to implementation one). For 5 mapping configurations 120 script files are required. Each script file must be manually generated with the content of deleting and creating host-volume-LUN mappings. If a configuration is redesigned, the script files must be recreated. Managing and testing large numbers of script files is a challenging and difficult task.

Thus, it would be desirable to provide an easy and reliable method and software for modification of host-to-volume mappings in a storage system.

SUMMARY OF THE INVENTION

Accordingly, the present invention may provide easy and reliable method and software for modification of host-to-volume mappings in a storage system.

In an exemplary aspect of the present invention, of the host-to-volume mappings of a SAN storage system are represented in mapping configuration components. The active mapping configuration component represents the current host-to-volume mapping for the SAN storage system. Only one mapping configuration component is active at a time. The host-to-volume mappings of a SAN storage system are changed by deactivating the active mapping configuration component and activating an inactive mapping configuration component that represents a different mapping configuration, effecting a repartition, repurpose, disaster recovery, or other business activity. This can be a scheduled task or performed in an on-demand manner. The mapping configuration components are managed and controlled through the management component of the SAN storage system.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
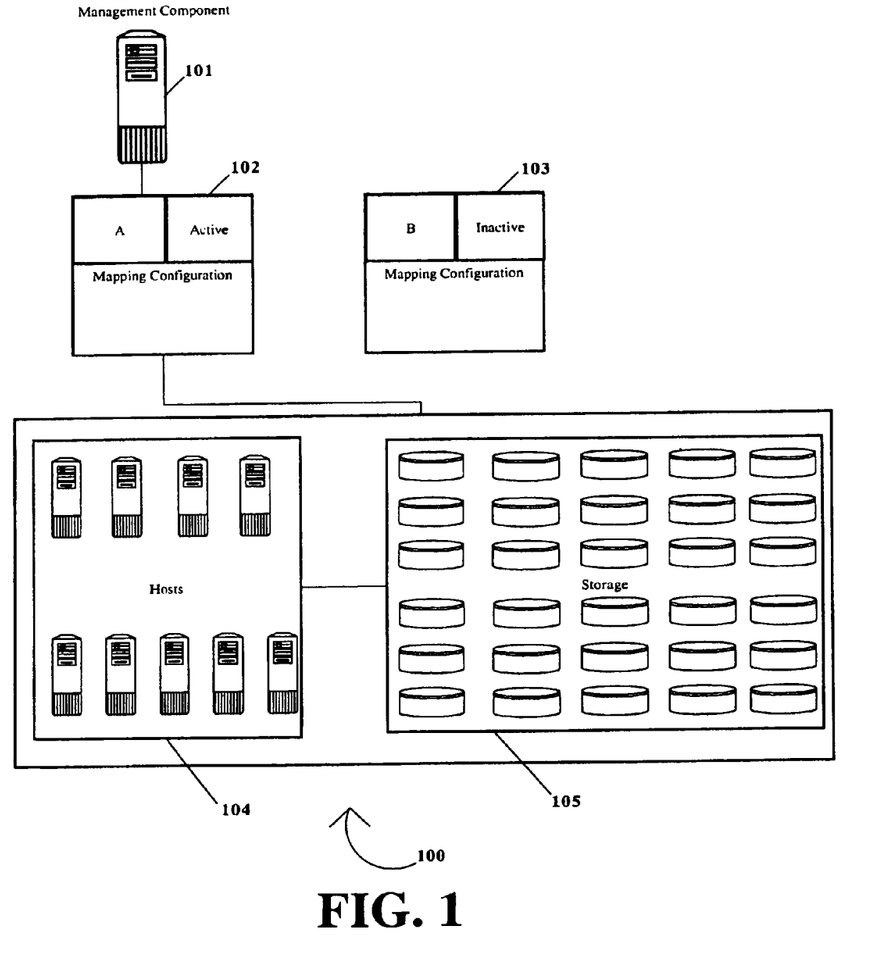
FIG. 1 is a block diagram illustrating the functional relationship in a SAN system configuration between a management component, mapping configuration components, hosts and storage in accordance with an exemplary embodiment of the present invention.

Referring now to FIG. 1, the functional relationship in a SAN (storage area network) system configuration 100 between a management component 101, mapping configuration components 102 & 103, hosts 104 and storage system 105 in accordance with an exemplary embodiment of the present invention is illustrated. Physically, the SAN system configuration 100 may comprise servers, connectivity components such as switches and SAS (Serial Attached SCSI [Small Computer System Interface]) expanders, and storage systems such as RAID (redundant array of inexpensive disks or redundant array of independent disks) systems and storage appliances. Storage system 105 may be a storage array, RAID system, or any other intelligent storage appliances which provide storage virtualization. The mapping configuration components 102 & 103 represent mapping configurations of the host-to-volume mappings of the SAN system configuration 100. The mapping configuration components 102 & 103 are managed by the management component 101. The mapping configuration components 102 & 103 are software objects, not hardware components, stored inside the storage system 105. The management component 101 is a management client that knows how to talk to the storage system 105. The management component 101 controls which mapping configuration component 102 & 103 is active. Only one mapping configuration component 102 & 103 is active at a time. The mapping configuration components 102 & 103 include a unique identifier and a human readable alias. As shown, mapping configuration component 102 is active and mapping configuration component 103 is inactive. Thus, the mapping configuration represented by mapping configuration component 102 represents the current host-to-volume mapping for the hosts 104 and storage 105 of the SAN storage system 100. There may be mapping configuration components in addition to mapping configuration components 102 & 103.

Figure 2:
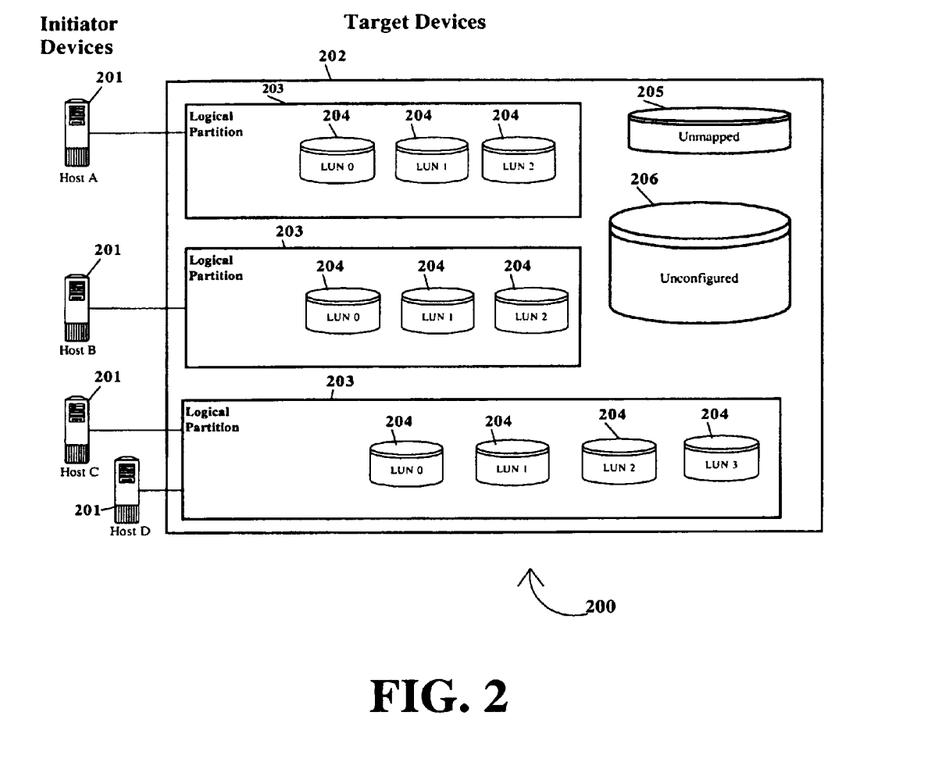
FIG. 2 is a block diagram illustrating a sample host-to-volume mapping configuration of a SAN storage system that may be represented by a mapping configuration component in accordance with an exemplary embodiment of the present invention.

Referring now to FIG. 2, a sample host-to-volume mapping configuration of a SAN storage system 200 that may be represented by a mapping configuration component in accordance with an exemplary embodiment of the present invention is illustrated. FIG. 2 illustrates the mapping between the initiator devices, hosts 201, and the target devices, storage 202. Each host 201 can access only the volumes 204 within the logical partition 203 of storage 202 mapped to it. Storage 202 may also contain unmapped 205 and unconfigured 206 storage space.

Figure 3:
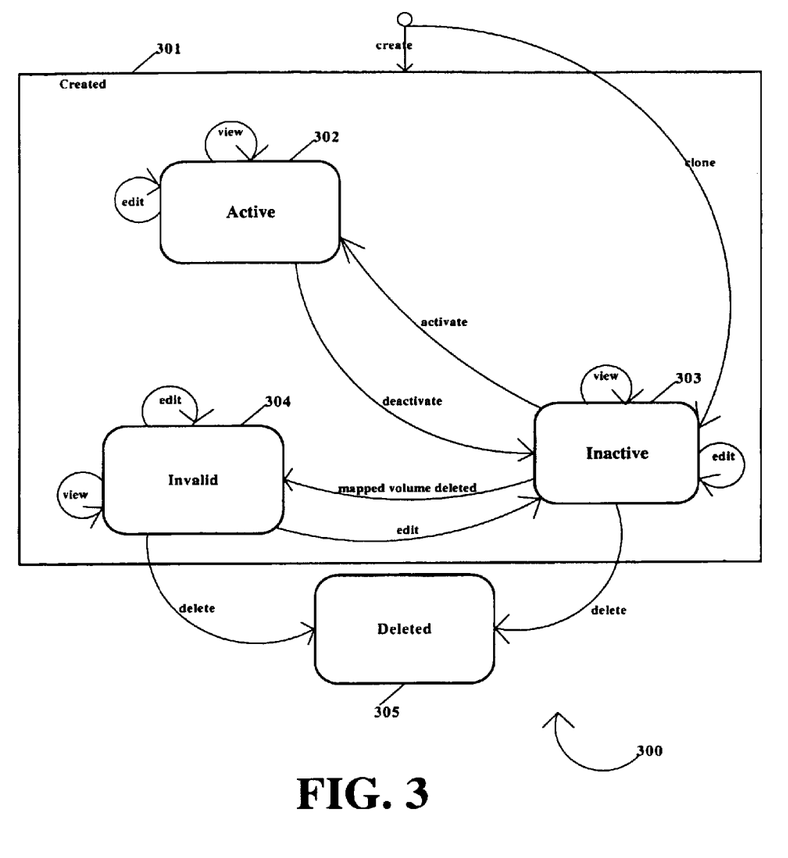
FIG. 3 is a state model diagram of a mapping configuration component in accordance with an alternative embodiment of the present invention.

Referring now to FIG. 3, a state model diagram 300 of a mapping configuration component in accordance with an exemplary embodiment of the present invention is illustrated. A mapping configuration component can be created 301, active 302, inactive 303, invalid 304, or deleted 305. When a SAN storage system is first booted a default mapping configuration component is created in the created 301 and active 302 state. When a mapping configuration component is in the active 302 state the mapping component represents the current mappings of the SAN storage system. A mapping configuration component in the created 301 state can be edited to establish host, volume, and logical unit number (LUN) relationship. A mapping configuration component in the created 301 state can be viewed, displaying all the host, volume, and LUN relationships contained therein. A mapping configuration component in the created 301 state can also be cloned to create another mapping configuration component in the created 301 and inactive 303 state. A mapping configuration component in the active 302 state can be deactivated, changing the mapping configuration component to the inactive 303 state and changing a mapping configuration component in the inactive 303 state to the active 302 state. If a volume mapped by a mapping configuration component in the inactive 303 state is deleted, the mapping configuration component is changed to the invalid 304 state. If a mapping configuration component in the invalid 304 state is edited so that the mapping configuration component maps to existing volumes, the mapping configuration component is changed to the inactive 303 state. A mapping configuration component in the inactive 303 state can be activated, changing the mapping configuration component to the active 302 state and changing the mapping configuration component in the active 302 state to the inactive 303 state. Mapping configuration components in the inactive 303 state and the invalid 304 state can be deleted, changing the mapping configuration components to the deleted 305 state.

Figure 4:
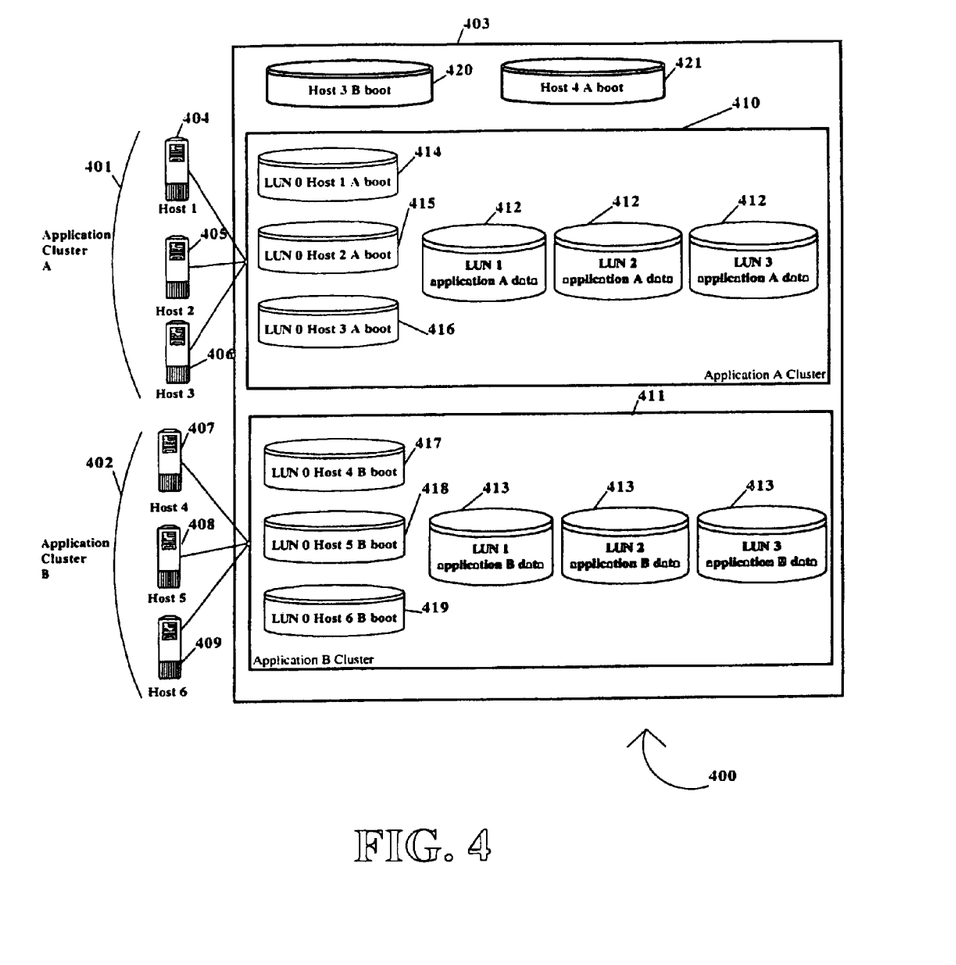
FIG. 4 is a is a block diagram illustrating a host-to-volume mapping configuration of a SAN storage system represented by a mapping configuration component in accordance with an exemplary embodiment of the present invention.

Referring now to FIG. 4, a host-to-volume mapping configuration of a SAN storage system 400 represented by a mapping configuration component in accordance with an exemplary embodiment of the present invention is illustrated. FIG. 4 illustrates the mapping between the two sets of initiator devices, Application Cluster A 401 and Application Cluster B 402, and the target devices, storage 403. Hosts 404, 405, and 406 in Application Cluster A 401 can access Application A Cluster logical partition 410. Hosts 407, 408, and 409 can access Application B Cluster logical partition 410. Volume 414 is the Application Cluster A boot volume for host 1 404. Volume 415 is the Application Cluster A boot volume for host 2 405. Volume 416 is the Application Cluster A boot volume for host 3 406. Volume 417 is the Application Cluster B boot volume for host 4 407. Volume 418 is the Application Cluster B boot volume for host 5 408. Volume 419 is the Application Cluster B boot volume for host 6 409. Application A data volumes 412 are available to all Application Cluster A 401 hosts. Boot volumes 414, 415, 416, 417, 418 and 419 are only accessible by the respective hosts that boot from them. Boot volumes 414, 415, 416, 417, 418 and 419 may be located on local volumes of the respective host that boots from them or may be located on a SAN. Volumes 420 and 421 are unmapped.

Figure 5:
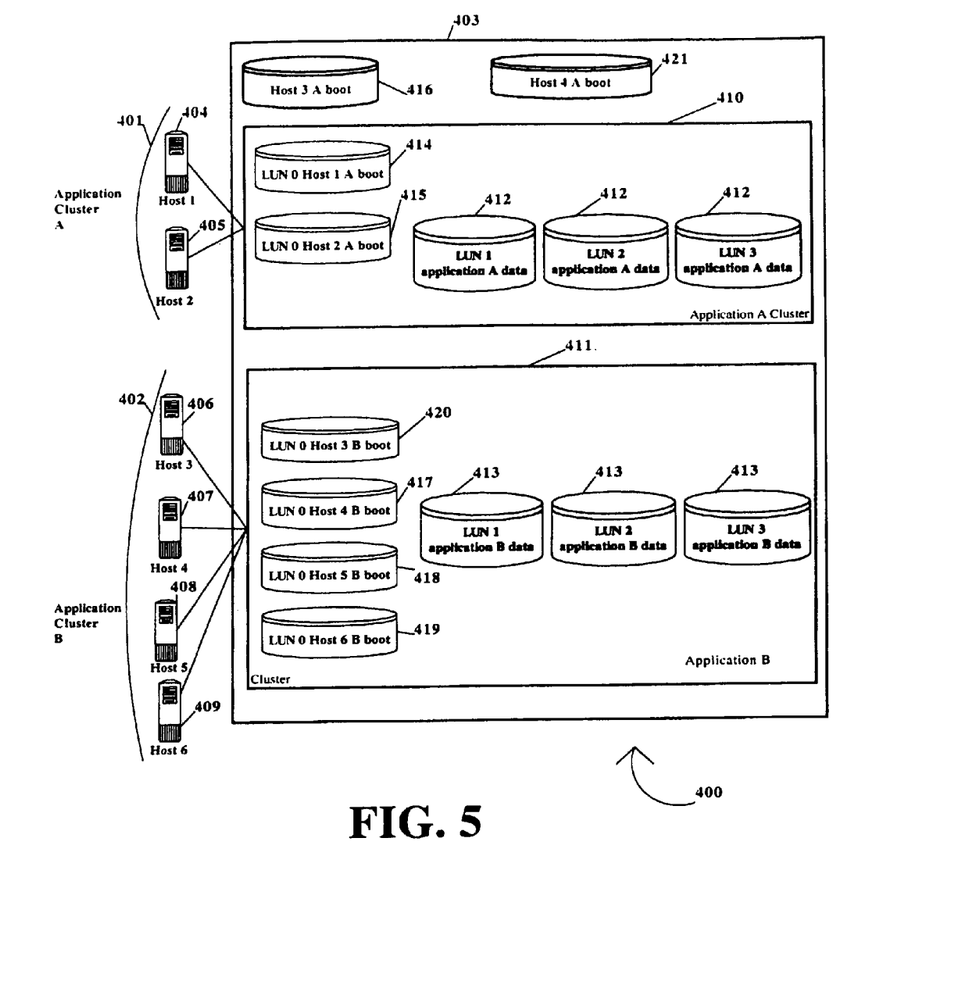
FIG. 5 is a block diagram illustrating a host-to-volume mapping configuration of a SAN storage system represented by a mapping configuration component in accordance with an exemplary embodiment of the present invention.

Referring now to FIG. 5, an alternative host-to-volume mapping configuration of the SAN storage system 400 represented by an alternative mapping configuration component in accordance with an exemplary embodiment of the present invention is illustrated. In the host-to-volume mapping configuration represented by this mapping configuration component host 3 406 is mapped to boot from volume 420 and is thus is part of Application Cluster B. Volume 416, the Application Cluster A boot volume for host 3 416, is unmapped.

Repartition (the moving of hosts from one workload host group to another workload host group) of SAN storage system 400 utilizing mapping configuration components to change the host-to-volume mappings of SAN storage system 400 from that illustrated in FIG. 4 to that illustrated in FIG. 5 in accordance with an exemplary embodiment of the present invention will now be described. The active mapping configuration component represents the current mapping configuration of SAN storage system 400 illustrated in FIG. 4. An inactive mapping configuration component represents the mapping configuration in FIG. 5. The active mapping configuration component, representing the mapping configuration illustrated in FIG. 4, is deactivated and the inactive mapping configuration component, representing the mapping configuration illustrated in FIG. 5 is activated. The affected host, host 3 406 is rebooted. On booting, host 3 406 boots from the host 3 Application Cluster B 420 boot volume and joins Application Cluster B 402.

Similarly, an inactive mapping configuration component may be activated to effect a repurpose (reallocating a server used for one purpose for another purpose), disaster recovery, or other business activity. These tasks may be a scheduled task or may be performed in an on-demand manner. Further, product verification organizations may utilize a storage system as a software repository and utilize this technique to switch test servers from one product, release, or configuration to another by activating different mapping configuration components. Disaster recovery implementations may utilize this technique to plan ahead and create and test mapping configurations for different infrastructure failure cases. A support center may utilize a storage system as a software repository for released products, versions, and supported configurations and create mapping configurations to duplicate a customer's hardware/software configuration and reduce service response time. A training facility could utilize the technique to switch training room computer systems from Windows to Linux or from Oracle training to web application development training.

Figure 6:
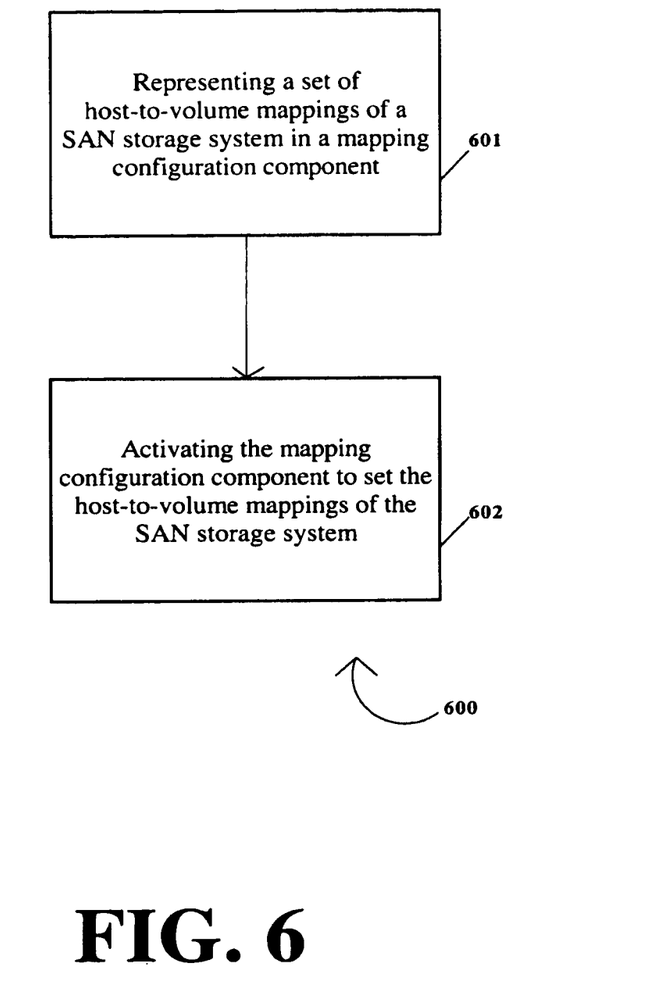
FIG. 6 is a flowchart of a method for managing the host-to-volume mappings of a SAN storage system in accordance with an exemplary embodiment of the present invention.

Referring now to FIG. 6, a method 600 for managing the host-to-volume mappings of a SAN storage system in accordance with an exemplary embodiment of the present invention is illustrated. In step 601, a set of host-to-volume mappings of a SAN storage system are represented in a mapping configuration component saved persistently in the storage array. The storage system includes a management interface to allow a management station or management application (running on a computer system outside the storage system) to retrieve (query) the mapping configuration component. In step 602, the mapping configuration component is activated to set the current host-to-volume mappings of the SAN storage system to that represented in the mapping configuration component.

Figure 7:
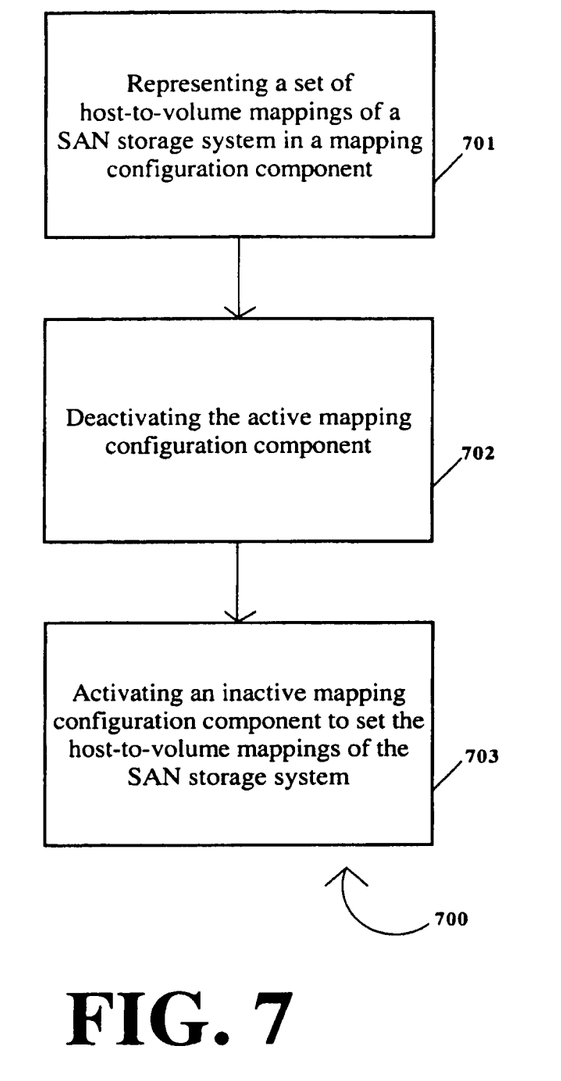
FIG. 7 is a flowchart of a method for managing the host-to-volume mappings of a SAN storage system in accordance with an alternative embodiment of the present invention.

Referring now to FIG. 7, a method 700 for managing the host-to-volume mappings of a SAN storage system in accordance with an alternative embodiment of the present invention is illustrated. In step 701, a set of host-to-volume mappings of a SAN storage system are represented in a mapping configuration component. In step 702, the active mapping configuration component is deactivated. In step 703, an inactive mapping configuration component is activated to set the current host-to-volume mappings of the SAN storage system to that represented in the now active mapping configuration component.

It is understood that the present invention is not limited to any underlying implementing technology. The present invention could also be used in a storage appliance or SAN appliance. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system comprising:
 a management client in a network storage environment, the management client in communication with a storage system of the network storage environment, the management client configured to:
  access and manage a plurality of host-to-volume mappings, each one of the host-to-volume mappings specifying at least one host initiator accessing at least a subset of logical volumes of the storage system, the host-to-volume mappings being stored at the storage system, wherein only one mapping of the plurality of host-to-volume mappings is in an active state at a given time;
  permit a host of the at least one host initiator to access only those volumes mapped to the host by the one mapping that is in the active state; and
  effecting a repartition or repurpose of the at least one host initiator by deactivating a first host-to-volume mapping and activating a second host-to-volume mapping to modify access of the at least one host initiator to the logical volumes of the storage system.

2. The system of claim 1, wherein the network storage environment comprises a storage area network (SAN).

3. The system of claim 1, wherein the storage system comprises at least one of a RAID (redundant array of inexpensive disks) system or a storage appliance.

4. The system of claim 1, wherein the plurality of host-to-volume mappings are stored persistently at the storage system.

5. The system of claim 1, wherein each of the host-to-volume mappings further specifies an application cluster of host initiators.

6. The system of claim 1, wherein the system is operable to change a host-to-volume mapping to be in an invalid state based on one of the logical volumes being deleted.

7. The system of claim 1, wherein the effecting a repartition or repurpose moves the at least one host initiator from a first host group to a second host group.

8. A method for managing access of a plurality of host initiators to a plurality of logical volumes in a network storage environment, the method comprising:
 communicating from a management client of the network storage environment to a storage component of the network storage environment to query a plurality of host-to-volume mappings stored at the storage component;
 after querying, changing access of a first one of the hosts to a first one of the logical volumes by deactivating a first host-to-volume mapping and activating a second host-to-volume mapping, wherein each one of the host-to-volume mappings specifies at least one host accessing at least a subset of logical volumes of the storage environment, and wherein only one of the plurality of host-to-volume mappings is in an active state at a given time; and
 permitting each host of the plurality of host initiators to access a volume of the plurality of logical volumes only when the volume is mapped to the host by the one of the plurality of host-to-volume mappings that is in the active state.

9. The method of claim 8, wherein changing access comprises:
 effecting a repartition or repurpose of the first one of the hosts.

10. The method of claim 8, wherein changing access moves the first host from a first host group to a second host group.

11. The method of claim 8, wherein the first and second host groups comprise different application clusters.

12. The method of claim 8, wherein the network storage environment comprises a storage area network (SAN).

13. The method of claim 8, further comprising:
changing the second host-to-volume mapping to be in an invalid state based on one of the logical volumes being deleted.

14. The method of claim 8, wherein the storage component comprises a RAID (redundant array of inexpensive disks).

15. A method for setting host-to-volume mappings of a storage system, comprising:
managing a set of a host-to-volume mappings of a storage system in a first mapping configuration component, the mapping configuration component having the capability to be active or inactive, only one mapping configuration component of a plurality of mapping configuration components being active at a time, each of the host-to-volume mappings specifying access of a given host to a given logical volume of the storage system such that the given host is only permitted to access a logical volume to which the given host is mapped by the mapping configuration component that is active; and
activating the first mapping configuration component to set current host-to-volume mappings of the storage system to those represented in the mapping configuration component.

16. The method of claim 15 further comprising:
deactivating a second mapping configuration that is replaced by the first mapping configuration.

17. The method of claim 15 further comprising:
changing the second mapping configuration to be in an invalid state based on one of the logical volumes being deleted.

18. The method of claim 15, wherein activating the first mapping configuration moves a first host from a first host group to a second host group.

19. The method of claim 15, wherein the first mapping configuration component groups a set of hosts of the storage system into at least one application cluster.

20. The method of claim 15, wherein the activating of the first mapping configuration component effects a repurpose of the storage system.

\* \* \* \* \*